(12) United States Patent
Bassirat et al.

(10) Patent No.: US 12,445,238 B2
(45) Date of Patent: *Oct. 14, 2025

(54) METHOD AND SYSTEM FOR UTILIZING NON-STANDARD BANDWIDTHS USING CARRIER AGGREGATION FOR DEVICES SUPPORTING STANDARD BANDWIDTHS

(71) Applicant: DISH WIRELESS L.L.C., Englewood, CO (US)

(72) Inventors: Farhad Bassirat, Arlington, VA (US); Mehdi Alasti, Reston, VA (US); Siddhartha Chenumolu, Broadlands, VA (US)

(73) Assignee: DISH Wireless L.L.C., Englewood, CO (US)

( * ) Notice: Subject to any disclaimer, the term of this patent is extended or adjusted under 35 U.S.C. 154(b) by 46 days.

This patent is subject to a terminal disclaimer.

(21) Appl. No.: 18/211,195

(22) Filed: Jun. 16, 2023

(65) Prior Publication Data

US 2023/0336289 A1 Oct. 19, 2023

Related U.S. Application Data

(63) Continuation of application No. 16/721,426, filed on Dec. 19, 2019, now Pat. No. 11,722,267.

(51) Int. Cl.
*H04L 5/00* (2006.01)
*H04L 27/26* (2006.01)
(Continued)

(52) U.S. Cl.
CPC ............ *H04L 5/001* (2013.01); *H04L 5/0053* (2013.01); *H04L 27/2657* (2013.01); *H04W 72/0453* (2013.01); *H04W 72/12* (2013.01); *H04W 72/1263* (2013.01); *H04W 72/23* (2023.01); *H04L 5/0098* (2013.01)

(58) Field of Classification Search
CPC ... H04L 5/001; H04L 5/0053; H04L 27/2657; H04L 5/0098; H04L 5/0044; H04W 72/0453; H04W 72/12; H04W 72/1263; H04W 72/23; H04W 76/10; H04B 1/005
See application file for complete search history.

(56) References Cited

U.S. PATENT DOCUMENTS

2010/0296389 A1* 11/2010 Khandekar ........... H04L 5/0037
370/242
2011/0081913 A1 4/2011 Lee et al.
(Continued)

OTHER PUBLICATIONS

International Preliminary Report on Patentability received for PCT Patent Application No. PCT/US20/065366, mailed on Jun. 30, 2022, 8 pages.

(Continued)

*Primary Examiner* — Shawn D Miller
(74) *Attorney, Agent, or Firm* — Jeremiah J. Baunach; Fronter IP Law PLLC

(57) ABSTRACT

A new radio base station establishes a first and a second component carrier in carrier aggregation. The first and second component carrier overlap each other. The base station transmits signaling and control information exclusively on the first component carrier. The base station transmits data packets on the first component carrier and on a non-overlapping portion of the second component carrier.

16 Claims, 7 Drawing Sheets

(51) Int. Cl.
  *H04W 72/0453* (2023.01)
  *H04W 72/12* (2023.01)
  *H04W 72/1263* (2023.01)
  *H04W 72/23* (2023.01)

(56) References Cited

U.S. PATENT DOCUMENTS

| | | |
|---|---|---|
| 2013/0242880 A1 | 9/2013 | Miao et al. |
| 2014/0219233 A1 | 8/2014 | Ahn et al. |
| 2017/0289889 A1* | 10/2017 | Sahu .................... H04W 24/10 |
| 2018/0270714 A1* | 9/2018 | Martin .................. H04W 8/005 |
| 2019/0320334 A1* | 10/2019 | Djuknic ............ H04W 72/0453 |
| 2020/0059904 A1 | 2/2020 | Takeda et al. |
| 2020/0274517 A1 | 8/2020 | Fukuhara et al. |
| 2020/0313710 A1* | 10/2020 | Mori ........................ H03F 3/189 |
| 2021/0084625 A1* | 3/2021 | Ryu ..................... H04W 72/23 |

OTHER PUBLICATIONS

International Search Report and Written Opinion received for PCT Patent Application No. PCT/US20/065366, mailed on Mar. 29, 2021, 9 pages.

* cited by examiner

500

502

ESTABLISH, WITH A BASE STATION, A FIRST COMPONENT CARRIER HAVING A FIRST FREQUENCY BAND

504

ESTABLISH, WITH THE BASE STATION, A SECOND COMPONENT CARRIER IN CARRIER AGGREGATION WITH THE FIRST COMPONENT CARRIER AND HAVING A SECOND FREQUENCY BAND THAT OVERLAPS THE FIRST FREQUENCY BAND

506

TRANSMIT, FROM THE BASE STATION, SIGNALING AND CONTROL INFORMATION EXCLUSIVELY ON THE FIRST COMPONENT CARRIER

508

SCHEDULE DATA PACKETS ON A NON-OVERLAPPING PORTION OF THE SECOND COMPONENT CARRIER

Figure 5

METHOD AND SYSTEM FOR UTILIZING NON-STANDARD BANDWIDTHS USING CARRIER AGGREGATION FOR DEVICES SUPPORTING STANDARD BANDWIDTHS

BACKGROUND

Technical Field

The present disclosure relates to mobile wireless communication systems, and more particularly relates to mobile communication systems that use carrier aggregation.

Description of the Related Art

Wireless mobile communication technology uses various standards and protocols to transmit data between a base station and user equipment (UE). Wireless wide area network communication system standards and protocols can include, for example, the 3$^{rd}$ Generation Partnership Project (3GPP).

Current 3GPP for 5G specifications support specific component carrier bandwidths such as 5 MHz, 10 MHz, 15, MHz or 20 MHz. Individual component carriers, however, to meet the International Mobile Telecommunications Advanced (IMT-Advanced) requirements for very high data rates, the concept of carrier aggregation has been introduced to support bandwidths larger than 20 MHz. Also, carrier aggregation helps wireless operators to increase their data rates over the chunks of spectrum they own, intraband or interband. Currently, the carder aggregation concept in LTE allows up to 32 component carriers of the same frame structure to be aggregated such that the total bandwidth available to a mobile terminal is the sum of the bandwidths of the cells. The 5G New RAT (NR) allows carrier aggregation of up to 16 carrier components. As used herein, a component carrier may be referred to as a cell.

BRIEF SUMMARY

In one embodiment a method for operating a base station includes establishing, with a base station, a first component carrier having a first frequency band. The method includes establishing, with the base station, a second component carrier in carrier aggregation with the first component carrier and having a second frequency band that overlaps the first frequency band. The method includes transmitting, from the base station, signaling and control information exclusively on the first component carrier and scheduling data packets on a non-overlapping portion of the second component carrier.

In one embodiment, a method for operating a base station includes establishing, with a new radio compliant base station, a first component carrier having a first frequency band. The method includes establishing, with the base station, a second component carrier in carrier aggregation with the first component carrier and having a second frequency band that overlaps with the first frequency band. The method includes transmitting, from the base station, synchronization signal blocks exclusively on the first component carrier and scheduling, with the base station, data packets on both the first component carrier and on the second component carrier.

In one embodiment, a base station includes a transceiver configured to transmit and receive signals, one or more processors coupled to the transceiver, and one or computer readable media including instructions that, when executed by the one or more processors, perform a process. The process includes establishing, at least in part with the transceiver, a first component carrier having a first frequency band and establishing, at least in part with the transceiver, a second component carrier in carrier aggregation with the first component carrier and having a second frequency band that overlaps with the first frequency band. The process includes transmitting, with the transceiver, signaling and control information exclusively on the first component carrier and scheduling data packets on a portion of the second component carrier that does not overlap with the first component.

BRIEF DESCRIPTION OF THE SEVERAL VIEWS OF THE DRAWINGS

FIG. 5 is a flow diagram of a method for operating a mobile communication network base station, according to one embodiment.

DETAILED DESCRIPTION

Figure 1:
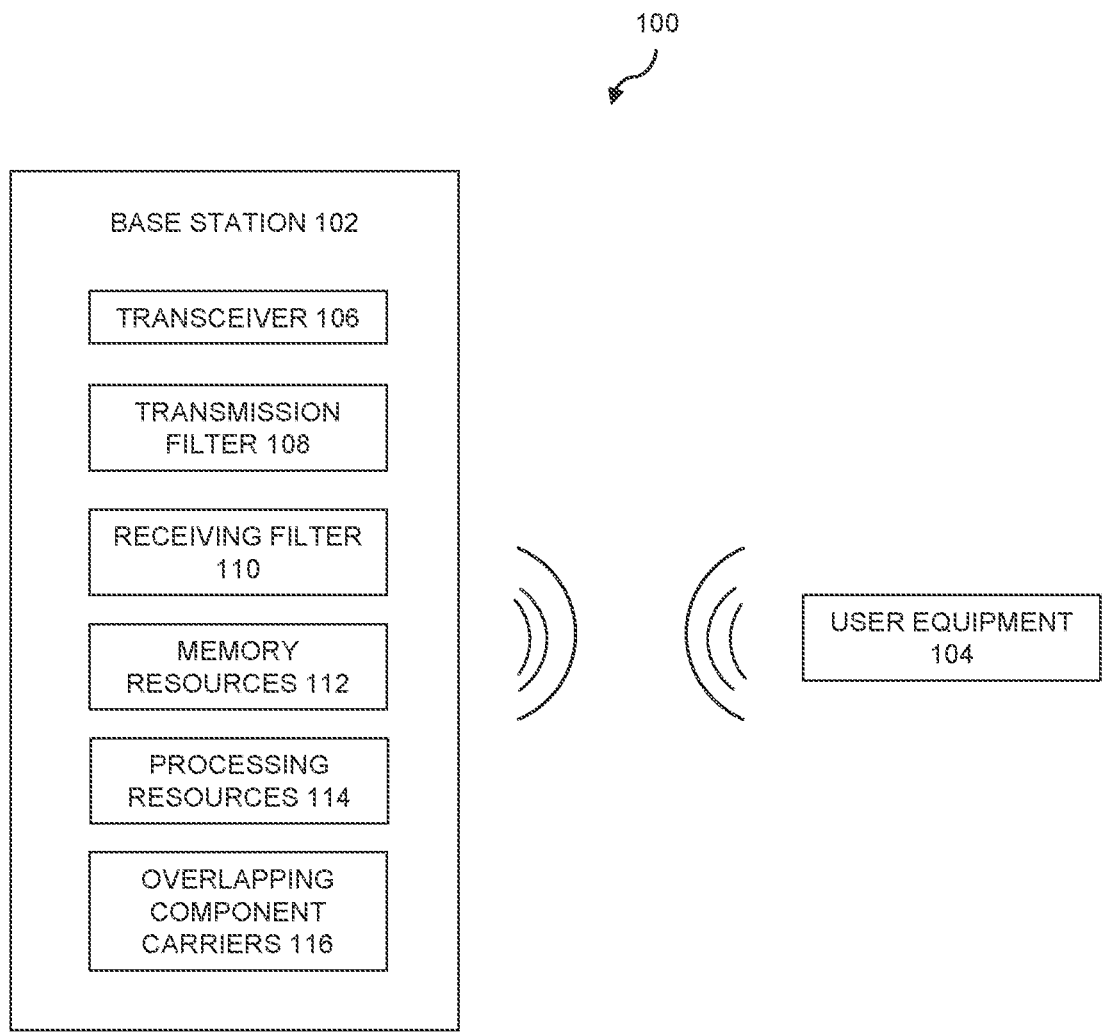
FIG. 1 is a block diagram of a wireless communication system, according to one embodiment.

FIG. 1 is a block diagram of a wireless communication system 100, according to one embodiment. The wireless communication system 100 includes a base station 102 and a UE 104. The base station 102 enables the UE 104 to communicate with other UEs or to send and receive data via the Internet.

The base station 102 includes a transceiver 106, a transmission filter 108, a receiving filter 110, memory resources 112, and processing resources 114. The transceiver 106 transmits mobile communication signals to the UE 104, to other base stations, and to other communication systems to enable mobile communication and access to the Internet. The memory resources 112 include one or more computer readable media that store software instructions for establishing a mobile communication network with the base station 102. The processing resources 114 execute the instructions stored in one or more computer readable media of the memory resources 112. As set forth in more detail below, executing the software instructions causes the base station 102 to establish overlapping component carriers 116.

In one embodiment, the communication system 100 is a 3GPP network. The communication system 100 can include a new radio (NR) fifth generation (5G) network. The communication system 100 can include other types of networks without departing from the scope of the present disclosure.

3GPP standards have defined specific bandwidths that can be utilized by 5G NR UE. In particular, UEs can utilize bandwidths of 5 MHz, 10 MHz, 15 MHz, 20 MHz, etc.

3GPP standards for 5G do not provide for UEs utilizing bandwidths that are below 5 MHz or that are not multiples of 5 MHz.

Organizations and companies that wish to provide wireless communication network services typically purchase the rights to a particular portion of wireless spectrum. For example, 3GPP standards define a large number of evolved universal mobile telecommunications system (E-UTRA) bands in the radio frequency spectrum. Wireless service providers can purchase, license, or otherwise acquire bandwidth within one or more of these bands and can then provide mobile communication services within that portion of the band.

Bandwidth can be very expensive. In the United States, some organizations pay billions of dollars for bandwidth in various regions. Due to the high cost of bandwidth, it is expensive to purchase an amount of bandwidth that falls between the specific bandwidths that can be utilized by UEs. Organizations typically seeks to purchase an amount of bandwidth that corresponds to one of the specified bandwidths that can be utilized by UEs in order to avoid wasting any excess bandwidth. In other words, organizations typically seek to purchase bandwidths of 5 MHz, 10 MHz, 15 MHz, 20 MHz, etc. so that there is not leftover bandwidth between the specified 5 MHz, 10 MHz etc.

Nevertheless, due to the complex licensing, optioning, and purchasing of bandwidth by various organizations, oftentimes organizations end up with rights to utilize an odd amount of bandwidth. As used herein, an odd amount of bandwidth corresponds to an amount of bandwidth that falls between specific bandwidths authorized for UEs by 3GPP standards. In this situation, one possible solution is to simply leave the leftover bandwidth unused. This results in a large spectrum inefficiency. For example, if an organization owns the rights to a bandwidth of 7 MHz, the organization could define a 5 MHz system and leave the remaining 2 MHz of bandwidth unused. This corresponds to approximately 35% of the purchased bandwidth going unused.

The wireless communication system 100 addresses this issue by defining multiple component carriers that overlap with each other within the purchased bandwidth. Accordingly, the base station 102 of the communication system 100 defines overlapping component carriers 116. The component carriers overlap with each other in the sense that their defined frequency bands overlap with each other. The component carriers overlap with each other in carrier aggregation.

Carrier aggregation is a technique enabled in 3GPP standards that enables multiple component carriers to be assigned to the same UE. The maximum possible data rate per UE is increased the more component carriers are assigned to the UE. Traditionally, three types of carrier aggregation have been utilized: intraband continuous carrier aggregation, intraband noncontiguous carrier aggregation, and intraband carrier aggregation. Intraband contiguous carrier aggregation corresponds to a situation in which the component carriers are contiguous of each other, i.e. one component carrier begins where the other component carrier ends. Intraband noncontiguous carrier aggregations correspond to a situation in which component carriers are in the same frequency band but are separated by a gap. Intraband carrier aggregation corresponds a situation in which the component carriers lie in different frequency bands.

The wireless communication system 100 utilizes intraband overlapping carrier aggregation. Intraband overlapping carrier aggregation defines two or more component carriers that overlap with each other in the frequency spectrum. Each component carrier has a bandwidth that is less than the total bandwidth of the network. In an example in which the communication system 100 utilizes two component carriers, a first component carrier has a bandwidth that begins at the beginning of the allotted network bandwidth. A second component carrier has a bandwidth that begins at a frequency that is intermediate to the bandwidth of the first component carrier and that ends at the end of the total network bandwidth. Accordingly, a portion of the first component carrier overlaps with a portion of the second component carrier.

One result of the overlapping component carrier aggregation is that none of the network bandwidth is wasted. Another result of the overlapping component carrier aggregation is that none of the component carriers extend into the bandwidth of neighboring networks or systems. Accordingly, the wireless communication system 100 efficiently uses its full network bandwidth.

In one example, in accordance with one embodiment, the wireless communication system 100 has access to 7 MHz of bandwidth in LTE band 26. The wireless communication system 100 defines a first component carrier and a second component carrier within the 7 MHz of bandwidth. Each component carrier is a 5 MHz component carrier in accordance with 3GPP standards. However, the component carriers overlap with each other. If the first component carrier begins at the beginning of the network bandwidth and the second component carrier ends at the end of the network bandwidth, then the overlapping bandwidth of the two component carriers is about 3 MHz. As will be set forth in more detail below, the wireless communication system 100 manages the types of signals that are transmitted over the two component carriers such that efficient use is made of network resources.

Continuing with the example in which the wireless communication system 100 has access to 7 MHz of bandwidth, in practice, the two component carriers each include 4.5 MHz of bandwidth, rather than a full 5 MHz. This is because there are guard bands defined at the beginning and the end of the network bandwidth. In particular, a first guard band of 0.25 MHz is established at the beginning of the network bandwidth. A second guard band of 0.25 MHz is established at the end of the available network bandwidth. The result is that there is about 2.5 MHz of overlap between the two component carriers.

Each component carrier is divided into 25 physical resource blocks (PRB). Each PRB has a bandwidth of about 180 kHz. The PRB defines the smallest unit used by a scheduling algorithm. Therefore, the minimal scheduled user transmission on the shared channel is one PRB. In the example in which the network bandwidth is 7 MHz, the overlapping portion of the two component carriers is about 14 PRBs. The communication system 100 defines how the overlapping PRBs will be utilized.

In one embodiment, in order to comply with 3GPP channel bandwidth, the base station 102 will be configured as a channel having a bandwidth that is the sum of the bandwidths of all of the component carriers without considering whether or not any of the bandwidths overlap. In an example in which the network bandwidth is 7 MHz and there are two component carriers in carrier aggregation, the base station will be configured as a 10 MHz channel but only transmits or receives over the system bandwidth of 7 MHz. A filter with 7 MHz bandwidth controls the out of band emission outside of the 7 MHz bandwidth. For other network bandwidths and other numbers of component carriers, the base station 102 will be configured as a channel having a bandwidth that is the sum of the bandwidths of all the component carriers.

In one embodiment, the base station 102 includes a transmission filter 108. The transmission filter 108 is a bandpass filter with a strict passband. The passband corresponds to the bandwidth that is assigned for the base station 102. Any signals with frequencies outside the passband are filtered so that they are not transmitted from the base station 102. This can help ensure that transmissions from the base station 102 do not infringe on bandwidth assigned to adjacent networks, while meeting the out of band emissions.

In one example, the communication system 100 has rights to a 7 MHz in band 26. The transmission filter 108 establishes passband corresponding to the designated 7 MHz of bandwidth. Signals outside the designated 7 MHz will not be transmitted from the base station 102 based, in part, on the transmission filter 108.

In one embodiment, the base station 102 includes a receiving filter 110. The receiving filter 110 is configured to ensure that the base station 102 will reject any signals outside of its designated bandwidth. Accordingly, the receiving filter 110 is a bandpass filter with a strict passband corresponding to the assigned bandwidth of the communication system 100. Thus, communications from networks in neighboring bandwidths, will not be received by the base station 102.

In the example in which the communication system 100 has rights to 7 MHz of bandwidth in LTE band 26. The receiving filter 110 establishes passband corresponding to the designated 7 MHz of bandwidth. Signals outside the designated 7 MHz will not be received by the base station 102 based, in part, on the transmission filter 108.

In one embodiment, no modifications for filtering changes are needed in the UE 104. The UE 104 operating in accordance with 3GPP standards can send and receive signals in the bandwidth of the communication system 100 even utilizing overlapping component carriers 116. The base station 102 defines the overlapping component carriers 116 in carrier aggregation, as well as the frequency bands for each component carrier. The user content 104 can operate in accordance with this configuration without further modification.

Examples have been given in which the overlapping component carriers 116 include two overlapping component carriers. However, the overlapping component carriers 116 can include more than two component carriers. For example, the overlapping component carriers 116 can include three or more component carriers.

In one embodiment, there are three component carriers in the overlapping component carriers 116. A first component carrier overlaps with a second component carrier. A second component carrier overlaps with the first component carrier. A third component carrier may be contiguous with the second component carrier or may overlap with a portion of the second component carrier. and a third component carrier. The second component carrier includes a portion that does not overlap with either the first or the third component carrier. Those of skill in the art will recognize, in light of the present disclosure, that many configurations of component carriers can be utilized without departing from the scope of the present disclosure.

Examples have been given in which the network bandwidth is 7 MHz. However, other nonstandard network bandwidths can be utilized in accordance with principles of the present disclosure. For example, network bandwidth could be between 5 MHz and 10 MHz, between 10 MHz and 15 MHz, between MHz and 20 MHz, etc. Varying numbers of component carriers can be utilized in these situations. For example, if the network bandwidth is 13 MHz, then the overlapping component carriers 116 can include three 5 MHz component carriers that overlap in the manner described above. In another example, if the network bandwidth is 17 MHz, then the overlapping component carriers 116 can include four 5 MHz component carriers in carrier aggregation, or overlapping of component carriers can include a 5 MHz component carrier and a 10 MHz component carrier in carrier aggregation.

In accordance with 3GPP standards for 5G NR systems, downlink synchronization within the wireless communication system 100 is accomplished using synchronization signal blocks (SSBs). The SSBs are transmitted from the base station 102 to the UE 104 at regular intervals based on a selected periodicity. The SSBs enable the UE 104 to acquire time and frequency synchronization with a cell and decode the Cell ID of that cell. This enables the UE 104 to read system information blocks (SIBs) from the base station 102, as will be described in more detail below.

Each SSB includes multiple components. In particular, each SSB includes a primary synchronization signal (PSS), a secondary synchronization signal (SSS) and a physical broadcast channel (PBCH). These signals facilitate synchronization between the base station 102 and the UE 104.

Before cell synchronization has taken place, the UE 104 will scan, with its radio, through different frequency channels depending on which bands it is supporting. When it is tuned to the band of the communication system 100, the UE first finds the PSS of the SSB. The PSS provides a radio frame boundary corresponding to a position of a first symbol in a radio frame. This enables the UE to be synchronized on a subframe level. The PSS is repeated in the same location in the same subframe of each SSB. From the PSS, the UE is able to obtain a physical layer identity.

After the UE 104 has obtained the PSS, the UE 104 finds the SSS. The SSS provides a subframe boundary corresponding to a position of a first symbol in a sub frame. After obtaining both the PSS and the SSS, the UE 104 is able to obtain a physical layer cell identity group number.

After obtaining the PSS and SSS, the UE 104 is able to acquire time instants of the PBCH. The center frequency of the PSS and SSS is aligned with the center frequency of the PBCH. Accordingly, synching with the PSS and SSS enables acquisition of the PBCH. The PBCH carries major information blocks (MIB). The MIBs facilitate system acquisition for the UE 104. In particular, the MIBs include the parameters needed to decode system information blocks (SIB).

SIBs enable attachment of a UE 104 to the communication network. Once uplink synchronization between the UE 104 and the network has been established and the UE 104 has read the MIB, the UE 104 waits for SIB type 1 which carries cell access related information and supplies the UE 104 with the scheduling of other SIBs. Reading SIB type 1 enables the UE 104 to gain access to the network. Without reading SIB type 1, the UE 104 cannot know about the sequences it has to transmit in PRACH or the transmit power at which the base station is transmitting.

3GPP standards also provide for control resource sets (CORESET). The CORESET is a set of physical resources, i.e. a specific area on NR downlink resource grid. The CORESET includes a set of parameters used to carry the physical downlink control channel (PDCCH) that carries the downlink control information (DCI). CORESET is localized to a specific region in the frequency domain. Bandwidth part is a contiguous set of PRBs on a given carrier. These PRBs are selected from a contiguous subset of the common resource blocks for a given numerology.

In one embodiment, the base station 102 sends SSBs, and other signaling and control information, exclusively on one of the component carriers. For example, the base station 102 can send SSBs exclusively on the first component carrier. SSBs are not sent on the second component carrier.

As set forth previously, SSBs include MIBs. In one embodiment, the MIBs of the SSBs point to SIBs exclusively on one of the component carriers. In particular, the MIBs of the SSBs point to SIBs exclusively on the same component carrier that included the SSBs. In the example in which the SSBs are provided exclusively on the first component carrier, the MIBs of the SSBs also point to SIBs exclusively on the first component carrier. Accordingly, in this example, SSBs are not provided on the second component carrier, and the MIBs do not point to SIBs on the second component carrier.

In one embodiment, the core resource set CORESET0 is provided by the base station 102 exclusively on one of the component carriers. For example, the base station 102 can provide CORESET0 exclusively on the first component carrier. In this case, the base station 102 does not provide CORESET0 on the second component carrier. In the example in which the first component carrier exclusively provides the SSBs and in which the MIBs point to SIBs exclusively on the first component carrier, the first component carrier can also provide CORESET0.

In one embodiment, the base station 102 includes a packet scheduler that schedules data packets to be provided to the UE 104 and to be provided by the UE 104. In particular, after the base station 102 has established a connection with the UE 104, the base station 102 can provide data packets to the UE 104 and can receive data packets from the UE 104. The data packets can include voice data for a phone call, data provided by a web server to the UE 104, data provided by the UE 104 to a web server, or other types of data commonly exchanged on wireless communication networks.

In one example, the UE 104 is a smart phone. After the UE 104 has established a network connection with the base station 102 resulting, in part, from receiving SSBs, decoding SIBs, and receiving CORESET0, a user of the UE 104 may select to stream a video on an application of the UE 104 via the Internet. The video stream is provided to the UE 104 in data packets from the base station 102.

In one embodiment, the packet scheduler of the base station 102 can schedule data packets on all of the component carriers. In an example in which there is a first component carrier and a second component carrier, the packet scheduler of the base station 102 can schedule data packets on both the first component carrier and the second component carrier. Accordingly, one of the component carriers may provide all of the signaling information such as SSBs and SIBs, while data packets may be provided on both component carriers.

Continuing with an example in which SSBs are provided exclusively on the first component carrier, and in which the MIBs point to SIBs exclusively on the first component carrier, data packets may be provided on both the first component carrier and on the second component carrier. In one embodiment, the data packets can be provided on an entire bandwidth of the first component carrier and on the non-overlapping bandwidth of the second component carrier. The portion of the second component carrier that overlaps with the first component carrier does not provide data packets or signaling information. The portion of the second component carrier that does not overlap with the first component carrier can provide data packets to and from the UE 104.

In 3GPP 5G NR standards, the channel on the uplink for synchronization is the physical random-access channel (PRACH). The PRACH opportunity is defined in SIBs associated with SSBs. In one embodiment, the UE 104 sends its PRACH exclusively on one of the component carriers. Continuing with an example in which SSBs are provided exclusively on the first component carrier, and in which the MIBs point to SIBs exclusively on the first component carrier, the UE 104 sends its PRACH exclusively on the first component carrier. The UE 104 can send data packets on the non-overlapping portion of the second component carrier.

Figure 2A:
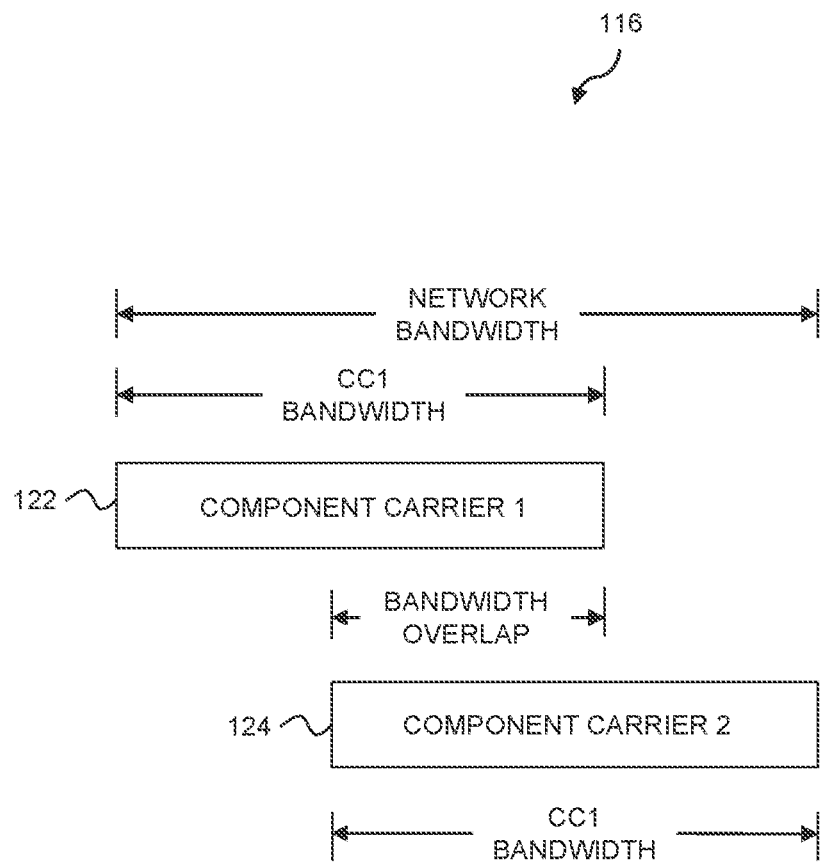
FIG. 2A is a representation of overlapping component carriers, according to one embodiment.

FIG. 2A is a representation of overlapping component carriers 116, according to one embodiment. The base station 102 transmits and receives signals over the span of the network bandwidth allotted to the base station 102. The base station 102 utilizes the overlapping component carriers 116 in a carrier aggregation configuration.

In the example of FIG. 2A, the base station 102 defines a first component carrier 122 and a second component carrier 124. The first component carrier 122 has a bandwidth that is less than the total network bandwidth. The second component carrier 124 has a bandwidth that is less than the total network bandwidth. The bandwidth of the first component carrier 122 overlaps with the bandwidth of the second component carrier 124. The bandwidth of the first component carrier 122 begins at the beginning of the network bandwidth. The bandwidth of the second component carrier 124 ends at the end of the network bandwidth.

Though not shown in FIG. 2A, in practice, there may, additionally, be guard bands present. A first guard band may buffer a beginning of the bandwidth of the first component carrier 122 from the beginning of the network bandwidth. A second guard band may buffer the end of the second component carrier 124 from the end of the network bandwidth.

Figure 2B:
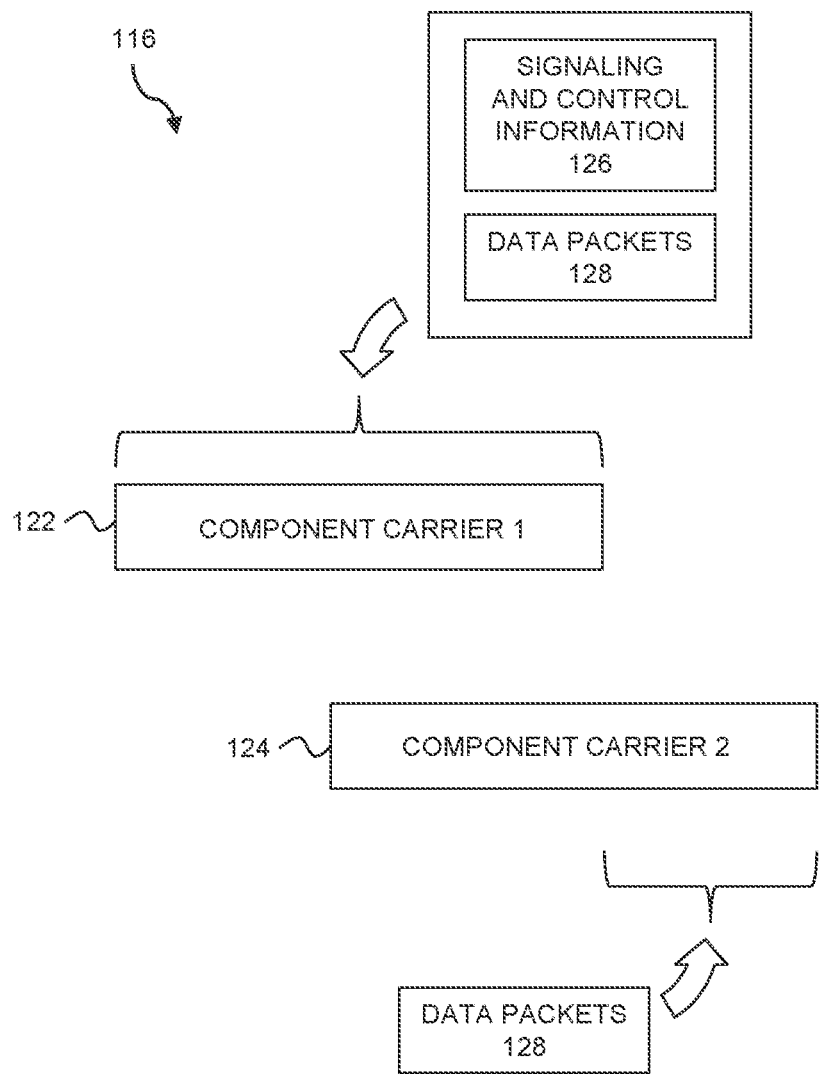
FIG. 2B is a representation of the overlapping component carriers of FIG. 2A with indications as to what types of signals are provided on each portion of each component carrier, according to one embodiment.

FIG. 2B is a representation of the overlapping component carriers 116 of FIG. 2A with indications as to what types of signals are provided on each portion of each component carrier, according to one embodiment. In the example of FIG. 2B, the entire bandwidth of the first component carrier 122 can be utilized to provide signaling and control information as well as data packets. In the example of FIG. 2B, the second component carrier 124 is used to provide data packets. Only the portion of the second component carrier 124 that does not overlap with the first component carrier 122 provides the data packets. Those of skill in the art will recognize, in light of the present disclosure, that other arrangements for controlling what types of signals are provided on the various portions of the component carriers can be utilized without departing from the scope of the present disclosure.

In one embodiment, the signaling and control information 126 includes the downlink and uplink signal synchronization and control signals. The signaling and control information 126 can include SSBs and their associated MIBs provided by the base station 102. The signaling and control information 126 can include SIBs provided by the base station 102. The signaling and control information 126 can include CORESETs provided by the base station 102. The signaling and control information 126 can include PRACH sent by the UE 104. The signaling and control information 126 can include other types of signals, signal components, and information other than those described above without departing from the scope of the present disclosure. The signaling and control information 126 can be provided exclusively on the first component carrier 122.

As described previously, after the base station 102 has established a connection with the UE 104, the base station 102 can provide data packets 128 to the UE 104 and can receive data packets 128 from the UE 104. The data packets 128 can include voice data for a phone call, data provided by a web server to the UE 104 via the base station 102, data provided by the UE 104 to a web server via the base station 102, or other types of data commonly exchanged on mobile communication networks. The data packets 128 can be provided on an entire bandwidth of the first component carrier 122 and on a non-overlapping portion of the second component carrier 124.

While FIG. 2B illustrates signaling and control information 126 being sent on a component carrier having a bandwidth that begins at a lower frequency than the other component carrier, in practice, the signaling and control information 126 can be sent on the component carrier having bandwidth that begins at a higher frequency. Those of skill in the art will recognize, in light of the present disclosure, that signaling and control information 126 and data packets 128 can be carried by the overlapping component carriers 116 and in various other manners than that shown in FIG. 2B without departing from the scope of the present disclosure.

Figure 3:
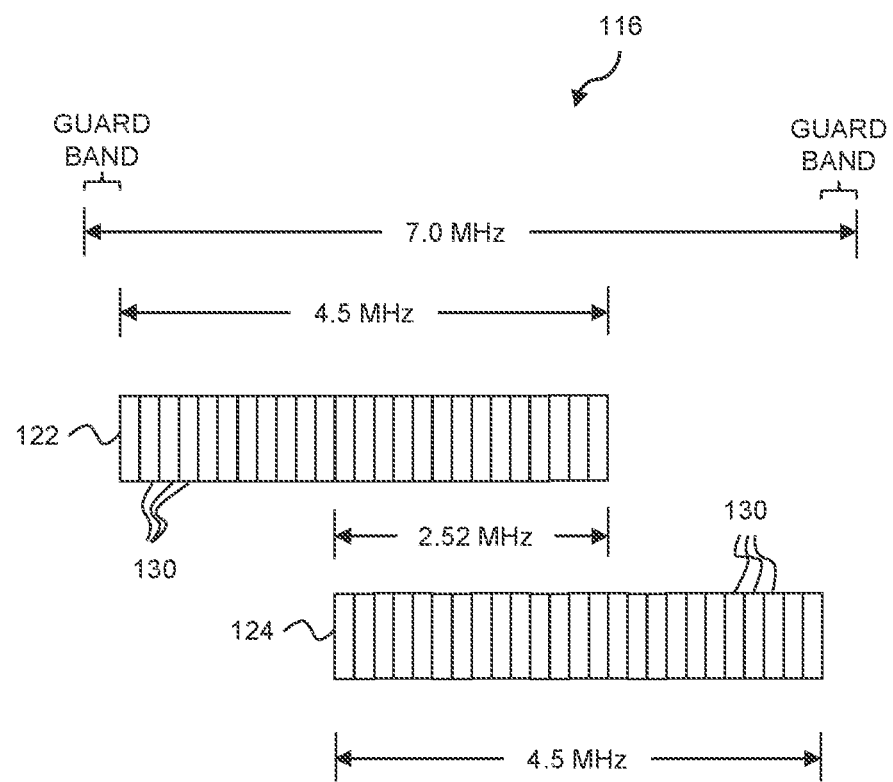
FIG. 3 is a representation of overlapping component carriers, according to one embodiment.

FIG. 3 is a representation of overlapping component carriers 116, according to one embodiment. In the example of FIG. 3, the network bandwidth is 7 MHz. In the example of FIG. 3, the base station 102 defines a first component carrier 122 and a second component carrier 124. The first component carrier 122 has an occupied bandwidth of 4.5 MHz. The second component carrier 124 has an occupied bandwidth of 4.5 MHz. A guard band of 0.25 MHz separates a beginning of the first component carrier 122 from a beginning of the network bandwidth. A guard band of 0.27 MHz separates an end of the second component carrier 124 from an end of the network bandwidth. The guard bands help ensure that the component carriers 122, 124 do not carry any signals in frequencies outside the allotted network bandwidth.

In standard carrier aggregation, each component carrier is allotted 5 MHz of bandwidth. 4.5 MHz of the component carrier is used for carrying signals between the base station 102 and the UE 104. 0.25 MHz is included on both ends of the component carrier as guard bands.

In the overlapping component carriers 116 of FIG. 3, there is a guard band before the first component carrier 122 and a guard band at the end of the second component carrier 124.

Each of the component carriers 122, 124 includes 25 physical resource blocks (PRB) 130. Each PRB 130 includes 12 subcarriers. Each PRB has a bandwidth of 180 kHz. In the example of FIG. 3, the first component carrier 122 and the second component carrier 124 have 2.52 MHz of overlapping bandwidth. This corresponds to 14 overlapping PRBs 130.

In one embodiment, all 25 PRBs of the first component carrier 122 can be utilized to provide signaling and control information 126 as well as data packets 128. In this case, the 14 overlapping PRBs 130 are utilized entirely by the first component carrier 122 to provide signal and control information 126 and/or data packets 128. The second component carrier 124 does not utilize the overlapping 14 PRBs 130. The second component carrier 124 utilizes its 11 non-overlapping PRBs to transmit data packets 128 as scheduled by the base station 102.

Figure 4:
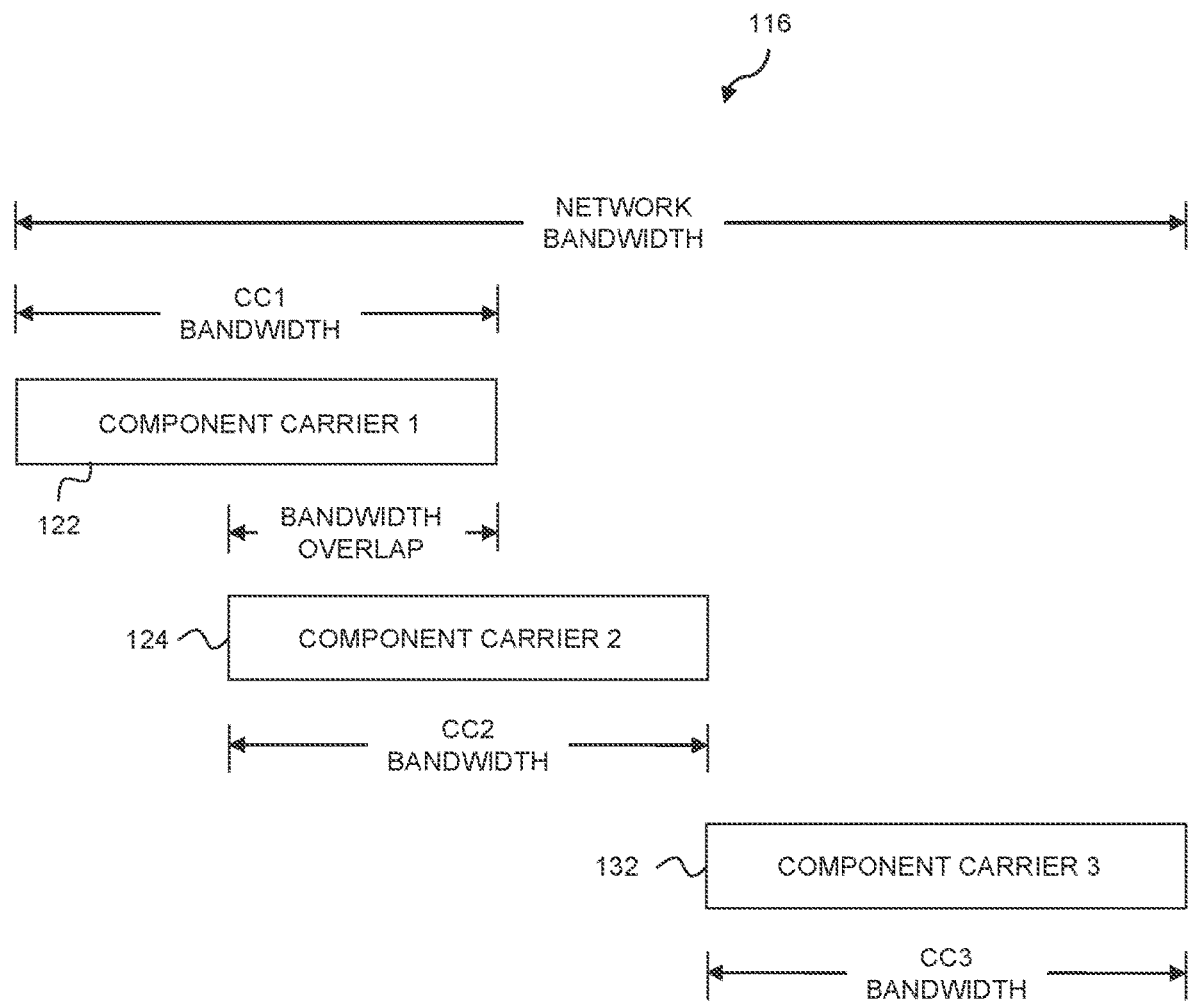
FIG. 4 is a representation of overlapping component carriers, according to one embodiment.

FIG. 4 is a representation of overlapping component carriers 116, according to one embodiment. The base station 102 transmits and receives signals over the span of the network bandwidth allotted to the base station 102. The base station 102 utilizes the overlapping component carriers 116 in a carrier aggregation configuration.

In the example of FIG. 4, the base station 102 defines a first component carrier 122, a second component carrier 124, and a third component carrier 132. The first component carrier 122 has a bandwidth that is less than the total network bandwidth. The second component carrier 124 has a bandwidth that is less than the total network bandwidth. The third component carrier 132 has a bandwidth that is less than the total network bandwidth. The bandwidth of the first component carrier 122 overlaps with the bandwidth of the second component carrier 124. The bandwidth of the third component carrier 132 begins at the end of the bandwidth of the second component carrier 124. In other words, the bandwidth of the third component carrier 132 is contiguous with the bandwidth of the second component carrier 124. The bandwidth of the first component carrier 122 begins at the beginning of the network bandwidth. The bandwidth of the third component carrier 132 ends at the end of the network bandwidth.

In one embodiment, the entirety of the first component carrier 122 can be utilized to provide signal and control information 126 and data packets 128. The non-overlapping portion of the second component carrier 124 can be utilized to provide data packets 128.

In one embodiment, the entirety of the third component carrier 132 can be utilized to provide both signaling and control information 126 and data packets 128. Alternatively, the third component carrier 132 can be utilized exclusively to provide data packets.

In one embodiment, the third component carrier 132 may overlap with the second component carrier 124. In this case, the entirety of the third component carrier 122 can be utilized to provide signal and control information 126 and data packets 128. The non-overlapping portion of the second component carrier 124 can be utilized to provide data packets 128. Many other configurations of overlapping component carriers 116 and many other schemes for distributing signals among the overlapping component carriers 116 can be utilized without departing from the scope of the present disclosure.

In one embodiment, the entirety third component carrier 132 can be utilized to provide both signaling and control information 126 and data packets 128. Alternatively, the third component carrier 132 can be utilized exclusively to provide data packets.

FIG. 5 is a flow diagram of a method 500, according to one embodiment. At 502, the method 500 includes establishing, with a base station, a first component carrier having a first frequency band. At 504, the method 500 includes establishing, with the base station, a second component carrier in carrier aggregation with the first component carrier and having a second frequency band that overlaps the first frequency band. At 506, the method 500 includes transmitting, from the base station, signaling and control information exclusively on the first component carrier. At 508, the method 500 includes scheduling data packets on a non-overlapping portion of the second component carrier.

Figure 6:
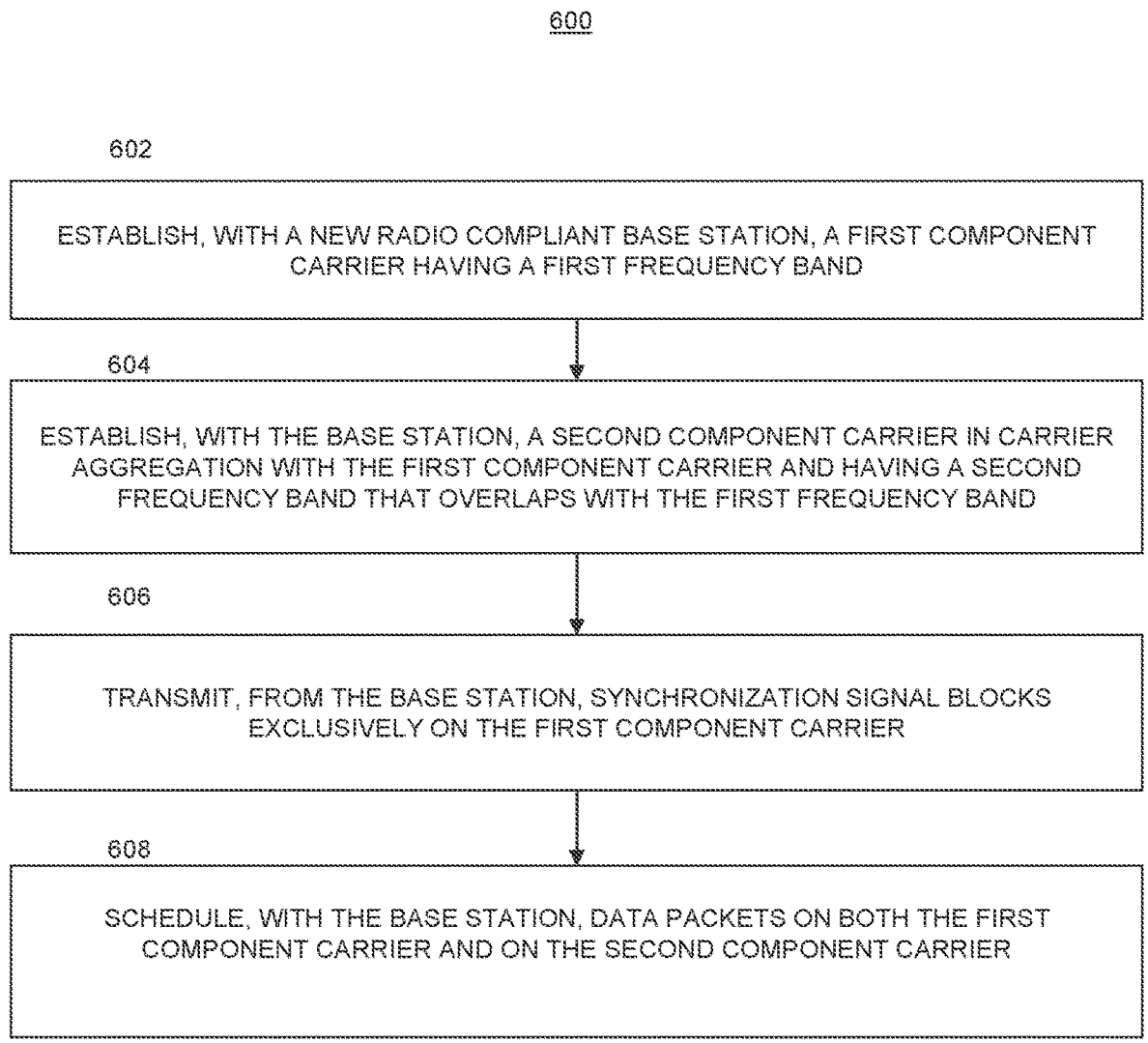
FIG. 6 is a flow diagram of a method for operating a mobile communication network base station, according to one embodiment.

FIG. 6 is a flow diagram of a method 600, according to one embodiment. At 602, the method 600 includes establishing, with a new radio compliant base station, a first component carrier having a first frequency band. At 604, the method 600 includes establishing, with the base station, a second component carrier in carrier aggregation with the first component carrier and having a second frequency band that overlaps with the first frequency band. At 606, the method 600 includes transmitting, from the base station, synchronization signal blocks exclusively on the first component carrier. At 608, the method 600 includes scheduling, with the base station, data packets on both the first component carrier and on the second component carrier.

The various embodiments described above can be combined to provide further embodiments. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
    establishing, with a base station, a first component carrier having a first frequency band;
    establishing, with the base station, a second component carrier in carrier aggregation with the first component carrier and the second component carrier having a second frequency band that overlaps the first frequency band of the first component carrier;
    scheduling data packets on a non-overlapping portion of the second component carrier; and
    transmitting a signaling and control information on an overlapping portion of the first component carrier, wherein the signaling and control information includes synchronization signal blocks that include major information blocks and the major information blocks point to signal information blocks on the first component carrier.

2. The method of claim 1, further comprising scheduling data packets on the first component carrier.

3. The method of claim 2, wherein the base station does not schedule data packets on an overlapping portion of the second component carrier.

4. The method of claim 1, further comprising establishing a transmission passband with a transmission filter of the base station, wherein the transmission passband ensures that the base station only transmits signals with an allotted bandwidth of the base station.

5. The method of claim 4, further comprising establishing a receiving passband with a receiving filter of the base station, wherein the receiving passband ensures that the base station only receives signals within the allotted bandwidth of the base station.

6. The method of claim 1, wherein the base station is a 5G new radio base station.

7. The method of claim 1, wherein the carrier aggregation complies with 3GPP standards.

8. A method, comprising:
    establishing, with a new radio compliant base station, a first component carrier having a first frequency band;
    establishing, with the base station, a second component carrier in carrier aggregation with the first component carrier and the second component carrier having a second frequency band that overlaps with the first frequency band of the first component carrier;
    scheduling, with the base station, data packets on both the first component carrier and on the second component carrier;
    transmitting a signaling and control information on an overlapping portion of the first component carrier, wherein the signaling and control information includes synchronization signal blocks that include major information blocks and the major information blocks point to signal information blocks on the first component carrier.

9. The method of claim 8, further comprising transmitting control resource sets exclusively on the first component carrier.

10. The method of claim 8, wherein the first component carrier and the second component carrier collectively cover an entirety of a network bandwidth allotted to the base station.

11. The method of claim 8, further comprising establishing, with the base station, a third component carrier in carrier aggregation with the first component carrier and the second component carrier and being contiguous with either the first component carrier or the second component carrier.

12. The method of claim 8, further comprising establishing, with the base station, a third component carrier in carrier aggregation with the first component carrier and the second component carrier and overlapping with either the first component carrier or the second component carrier.

13. The method of claim 8, wherein the first component carrier includes a plurality of first physical resource blocks, wherein the second component carrier includes a plurality of second physical resource blocks, wherein the base station does not schedule packets on second physical resource blocks that overlap with the first physical resource blocks.

14. A base station, comprising:
    a transceiver configured to transmit and receive signals;
    one or more processors coupled to the transceiver; and
    one or computer readable media including instructions that, when executed by the one or more processors, perform a process including:
        establishing, at least in part with the transceiver, a first component carrier having a first frequency band;
        establishing, at least in part with the transceiver, a second component carrier in carrier aggregation with the first component carrier and the second component carrier having a second frequency band that overlaps with the first frequency band of the first component carrier;
        scheduling data packets on a portion of the second component carrier that does not overlap with the first component carrier; and
        transmitting a signaling and control information on an overlapping portion of the first component carrier, wherein the signaling and control information includes synchronization signal blocks that include major information blocks and the major information blocks point to signal information blocks on the first component carrier.

15. The base station of claim 14, further comprising a transmission filter that establishes a transmission passband that ensures that the transceiver only transmits signals within an allotted bandwidth.

16. The base station of claim 14, further comprising a receiving filter configured to establish a receiving passband that ensures that the transceiver only receives signals within the allotted bandwidth.

\* \* \* \* \*